United States Patent
Viggers et al.

(10) Patent No.: US 10,497,083 B2
(45) Date of Patent: Dec. 3, 2019

(54) SYSTEMS AND METHODS FOR USING AN OPENGL API WITH A VULKAN GRAPHICS DRIVER

(71) Applicant: Channel One Holdings Inc., Tampa, FL (US)

(72) Inventors: Stephen Richard Viggers, Waterloo (CA); Tomislav George Malnar, Waterloo (CA); Sherwyn Ryan Ramkissoon, Waterloo (CA); Gregory John Szober, Waterloo (CA); Aidan Christopher Fabius, Waterloo (CA); Kenneth Wenger, Waterloo (CA); John Alexander McCormick, Waterloo (CA)

(73) Assignee: Channel One Holdings Inc., Tampa, FL (US)

( * ) Notice: Subject to any disclaimer, the term of this patent is extended or adjusted under 35 U.S.C. 154(b) by 0 days.

(21) Appl. No.: 15/331,078

(22) Filed: Oct. 21, 2016

(65) Prior Publication Data
US 2017/0116702 A1    Apr. 27, 2017

Related U.S. Application Data

(60) Provisional application No. 62/244,480, filed on Oct. 21, 2015.

(51) Int. Cl.
*G06T 1/20* (2006.01)
*G06T 17/00* (2006.01)
(Continued)

(52) U.S. Cl.
CPC ............... *G06T 1/20* (2013.01); *G06T 17/00* (2013.01); *G06T 11/001* (2013.01);
(Continued)

(58) Field of Classification Search
None
See application file for complete search history.

(56) References Cited

U.S. PATENT DOCUMENTS

2006/0010454 A1    1/2006  Napoli et al.
2015/0022541 A1*   1/2015  Zelsnack ................. G06F 8/443
                                                            345/589

(Continued)

FOREIGN PATENT DOCUMENTS

EP         1847966        10/2007

OTHER PUBLICATIONS

Redefining the shading languages ecosystem with SPIR-V—Mar. 3, 2015—Khronos.*
(Continued)

*Primary Examiner* — YuJang Tswei
(74) *Attorney, Agent, or Firm* — Woods Oviatt Gilman LLP; Dennis B. Danella, Esq.

(57) ABSTRACT

A system, method, and computer-readable medium are provided for translating OpenGL API calls to operations in a Vulkan graphics driver using an OpenGL-on-Vulkan driver architecture. An OpenGL-on-Vulkan driver receives an OpenGL context and render function, translates an OpenGL format to a Vulkan format, creates a Vulkan object and sets a Vulkan state, and generates a Vulkan command buffer corresponding to the OpenGL render function.

19 Claims, 8 Drawing Sheets

(51) Int. Cl.
*G06T 11/00* (2006.01)
*G06T 15/00* (2011.01)
*G06T 15/04* (2011.01)
*G06T 15/80* (2011.01)

(52) U.S. Cl.
CPC ............ *G06T 15/005* (2013.01); *G06T 15/04* (2013.01); *G06T 15/80* (2013.01); *G06T 2210/32* (2013.01)

(56) References Cited

U.S. PATENT DOCUMENTS

2016/0189681 A1* 6/2016 White .................. G09G 5/14
345/502
2019/0073741 A1 3/2019 Herring et al.

OTHER PUBLICATIONS

VktDrawIndirectTest—2015—GitLab.*
Khronos_cl_khr_gl_sharing—2009.*
External_vulkancts_framework_vulkan_vkBasicTypes—Sep. 1, 2005—GitLab—comment.*
An Interactive Introduction to OpenGL Programming—Shreiner etal—2010.*
Vulkan on NVIDIA GPUs—Daniell etal—Aug. 13, 2015.*
Lago Toral, "A brief introduction to the Linux graphics stack _ Developer Log", Jul. 29, 2014, WordPress simpleX (Year: 2014).*
"Standard Portable Intermediate Representation", http://en.wikipedia.org/wiki/Standard_Portable_Intermediate_Representation&oldid=830919313, Mar. 2018, 3 pages.
Holler, Helmut, "European Search Report", dated Feb. 22, 2017 for European Patent Application No. 16195170.2, European Patent Office, Berlin, Germany, 10 pages.
Robert, "Some thoughts about the Vulkan API (glNext) and the future of OpenGL", RenderingPipeline, Mar. 3, 2015, http://renderingpipeline.com/2015/03/some-thoughts-about-the-vulkan-api-glnext-and-the-future-of-opengl/, 14 pages.
Pan, Zhigeng, et al., "Real-time Translator from OpenGL to OpenGL ES for Mobile Devices", ICAT, State Key Lab of CAD&CG, Zhejiang University, Hangzhou, China, Centrality Communications Co., LtD, Shanghai, China, 5 pages.

* cited by examiner

SYSTEMS AND METHODS FOR USING AN OPENGL API WITH A VULKAN GRAPHICS DRIVER

PRIORITY CLAIM

This application claims the benefit of U.S. Provisional Patent Application Ser. No. 62/244,480 filed on Oct. 21, 2015, by the present inventor(s), and entitled "SYSTEMS AND METHODS FOR USING AN OPENGL API WITH A VULKAN GRAPHICS DRIVER", the entire contents of which are hereby incorporated by reference herein for all purposes.

TECHNICAL FIELD

The embodiments disclosed herein relate to generating computer graphics, and, in particular to systems and methods for using an OpenGL API with a Vulkan graphics driver.

INTRODUCTION

The following paragraphs are not an admission that anything discussed in them is prior art or part of the knowledge of persons skilled in the art.

In the field of computer graphics on embedded systems, the OpenGL API (of which there are multiple flavors and versions) has lead the industry in a variety of use cases. These use cases range from managing the graphics in avionics display systems to dashboard gauge clusters in automotive display systems, and 3D image processing in the medical field.

Technological advances in the graphics industry over the past decade have given rise to sophisticated Graphics Processing Units (GPUs) shifting the balance between serial pipelines to a much more parallelized approach. The ability to perform separate tasks in parallel as well as the modular architecture of today's GPUs means that for every graphics need, there are a variety of ways that a solution can be designed.

Vulkan has been introduced by the Khronos Consortium as a new modular API that is intended to take advantage of current GPUs. The OpenGL API, although less flexible than Vulkan, is still the most widely-used API in the industry. It is likely to remain the most widely-used API for several years to come.

With this in mind, there is a need to provide a Vulkan solution while simultaneously recognizing that continued support will be required for OpenGL drivers.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed below that is not claimed in this document may be the subject matter of another protective instrument, for example, a continuing patent application, and the applicants, inventors or owners do not intend to abandon, disclaim or dedicate to the public any such invention by its disclosure in this document.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or other storage elements), at least one input device, and at least one output device. For example and without limitation, the programmable computers may be a programmable electronic controller, mainframe computer, server, personal computer, laptop, personal data assistant, or cellular telephone. Program code is applied to input data to perform the functions described herein and generate output information. The output information is applied to one or more output devices, in known fashion.

Each program may be implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. read only memory (ROM) or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

In the field of computer graphics, a person skilled in the art will understand that particular terms have specific meanings and definitions provided by the OpenGL® standard. Generally speaking, the meanings and definitions of specific terms related to the OpenGL standard can be determined by referring to the standards and documentation published by the Khronos Consortium, such as at the website www.khronos.org. For example, the terms "context", "object", and "state" have specific meanings.

OpenGL can be viewed as a state machine. Thus, at any particular time, an OpenGL instance can be defined by its particular state. In this view, OpenGL functions can be grouped into three broad categories of functions. First are those functions that set state into an OpenGL context. Second are those functions that can query state. Third are those functions that preform rendering operations based on state.

An OpenGL context can be thought of as representing an object that stores the state associated with a particular instance of OpenGL. An OpenGL context can represent a default frame buffer that render commands can draw to rather than a framebuffer object.

An OpenGL object is a construct that contains a state. An OpenGL object can be bound to a particular context, in which case, the object state is mapped to the state of the context. Thus, changes in the state of the context will also be stored in the object, and functions that act on the context state will also use the object state. Objects can be classified as regular or container objects (or non-standard objects). Examples of regular objects are buffer objects, query objects, renderbuffer objects, sampler objects, and texture objects. Examples of container objects are framebuffer objects, program pipeline objects, transform feedback objects, and vertex array objects. Example of non-standard objects are sync objects and shader or program objects.

A texture object can contain one or more images, where all of the images have the same image format. The image format describes the way that data is stored in order to represent the images in texture objects and renderbuffer objects. In other words, the image format defines the meaning of the data associated with the image.

Figure 1A:
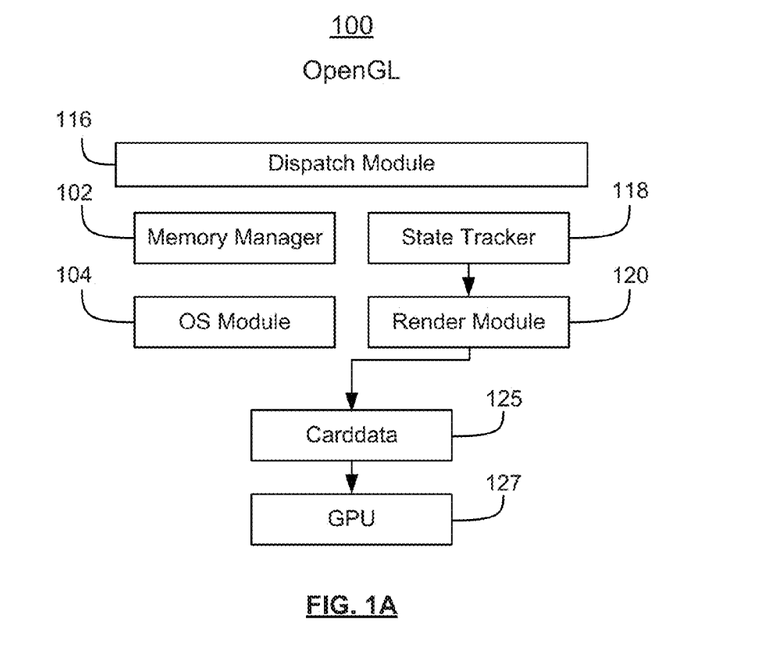
FIG. 1A is a block diagram of an OpenGL driver architecture.

Referring to FIG. 1A, there is a block diagram of an OpenGL driver architecture 100. The OpenGL driver is responsible for taking OpenGL API calls from an application, and providing associated hardware-specific instructions to a Graphics Processing Unit (GPU). The architecture of the OpenGL driver is described in terms of a dispatch module 116, a memory manager 102, and operating-system (OS) module 104, a state tracker 118, a render module 120, a carddata module 125, and a hardware GPU layer 127.

The dispatch module 116 is responsible for marshalling OpenGL API calls made by an application, to the corresponding function of the state tracker 118. This allows the state tracker 118 to track all states related to the OpenGL context. The state tracker 118 is specifically designed to be hardware agnostic so that it does not need to be re-written for different hardware (e.g. GPU) specifications.

Conversely, the render module 120 is hardware specific. In other words, the render module 120 is written for a particular type of hardware (e.g. GPU). Thus, for different GPUs. The render module 120 is responsible for taking the OpenGL context and OpenGL commands and converting them to hardware-specific state, types, and commands.

The carddata module 125 is the driver layer that sits directly on top of the GPU. As with the render module 120, the carddata module 125 is hardware specific. The carddata module 125 receives the hardware-specific state, types, and commands from the render module 120, derives hardware-specific GPU operations, and submits them to the GPU.

The implementation of the OpenGL driver architecture 100 is such that the render module 120 and the carddata module 125 (as well as the GPU 127) are hardware specific.

Thus, for a particular type of GPU 127, it is necessary to write a render module 120 and a carddata module 125 that work with the particular type of GPU 127. However, according to some embodiments, other parts of the driver architecture 100 (e.g. the dispatch module 116, the state tracker 118, etc.) may be common across different types of GPU 127.

Figure 1B:
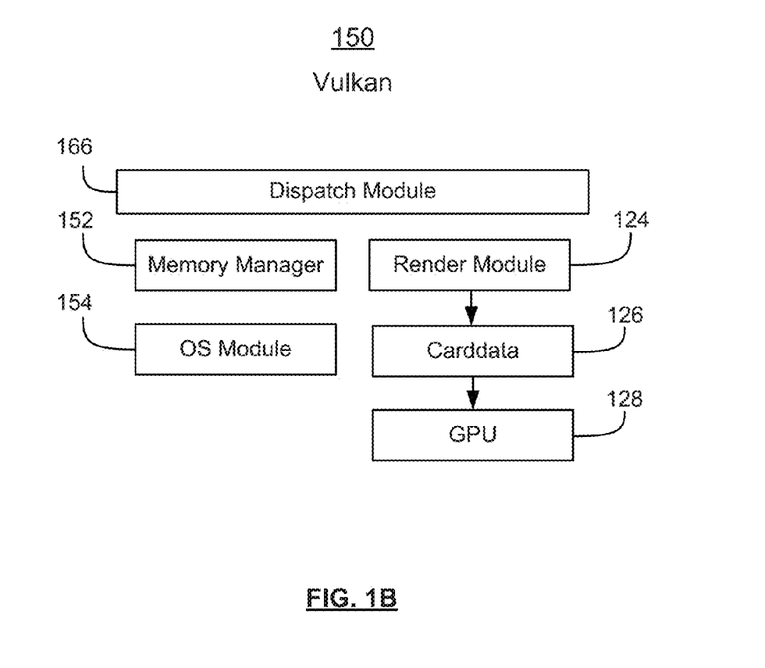
FIG. 1B is a block diagram of a Vulkan driver architecture.

Referring to FIG. 1B, there is a block diagram of a Vulkan driver architecture 150. The Vulkan driver architecture 150 comprises a dispatch module 166, a memory manager 152, an OS module 154, a render module 124, a carddata module 126, which sits on top of a GPU 125. This architecture 150 is similar to the OpenGL driver architecture 150, except that the Vulkan driver 150 does not include a state-tracker module. According to the Vulkan API, most of the state-like information (e.g. analogous to OpenGL state) is in the domain of the application itself. As with the OpenGL driver architecture 100 and its analogous components, according to some embodiments, the render module 124 and the carddata module 126 are specifically written for a particular GPU hardware.

Referring to FIG. 1A and FIG. 1B, the OpenGL driver architecture 100 is designed to operate with a first GPU 127, whereas the Vulkan driver architecture 150 is designed to operate with a second GPU 128. According to some embodiments, the GPU 127 may be optimized for OpenGL, whereas the GPU 128 may be optimized for OpenGL and/or Vulkan. In other words, the GPU 128 may be of the same type as the GPU 127, or it may be of a type that is particularly configured for use with Vulkan. Thus, the OpenGL driver architecture 100 provides the GPU 127 with instructions based on an application making OpenGL API calls, whereas the Vulkan architecture 150 provides the GPU 128 with instructions based on an application making Vulkan API calls. As such, when the GPU 128 is optimized for Vulkan, the OpenGL driver architecture 100 is incapable of providing instructions to the GPU 128 that fully utilize the capabilities of Vulkan.

According to some embodiments, it is possible to achieve a driver architecture that provides the GPU 128 with instructions based on an OpenGL API call (e.g. via dispatch module 116) through the use of a translator module that links the OpenGL render module 120 with the Vulkan render module 124. With the use of a translator module, the dispatch module 116, state tracker 118, render module 120, render module 124, and carddata module 126 can be used to provide the GPU 128 with instructions based on an application making OpenGL API calls.

Figure 2:
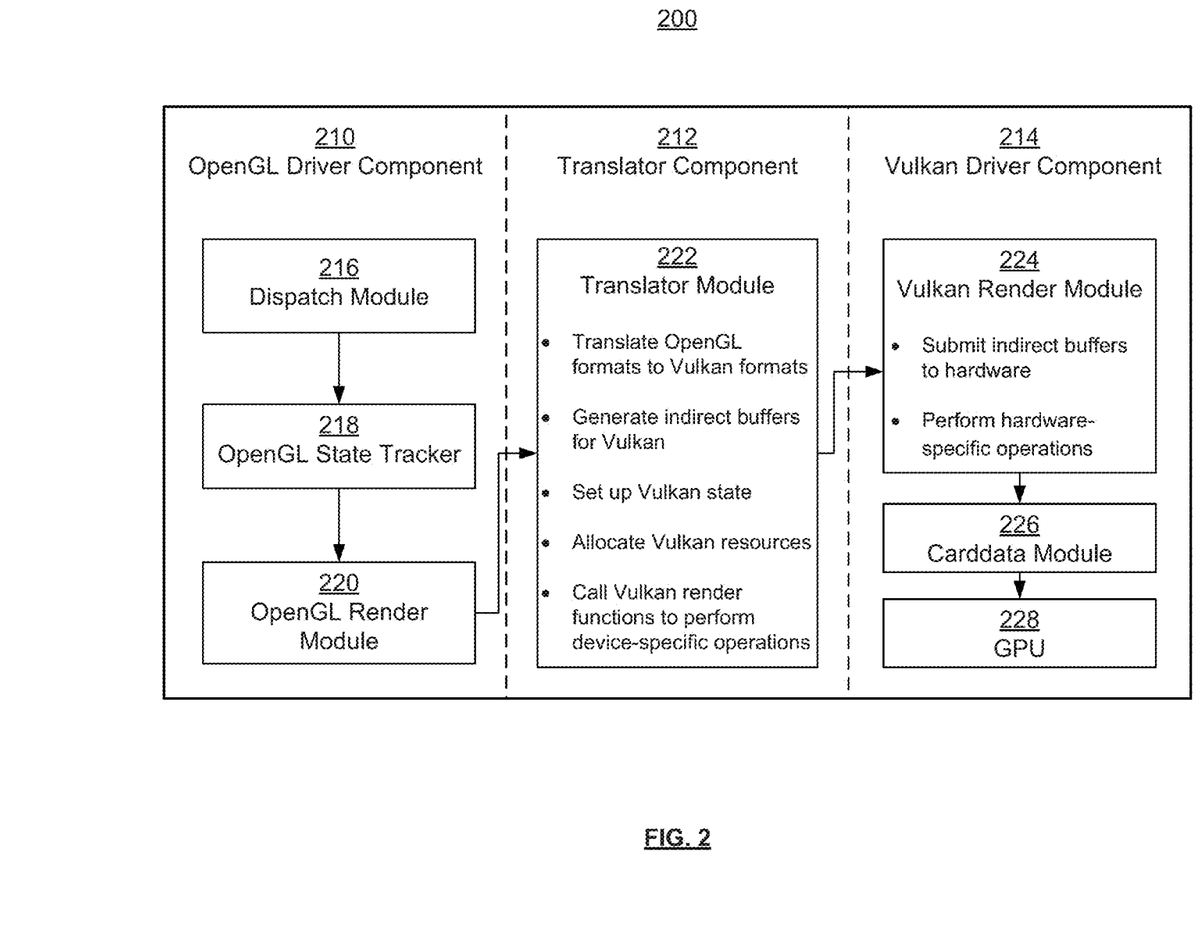
FIG. 2 is a block diagram of an OpenGL-on-Vulkan driver architecture, according to one embodiment.

An OpenGL-on-Vulkan driver architecture 200 is shown in FIG. 2. The driver architecture 200 can be described in terms of an OpenGL driver component 210, a translator component 212, and a Vulkan driver component 214. These components are distinguished in order to describe the operability of the driver architecture 200 in terms of the OpenGL components (analogous to OpenGL driver architecture 100), the Vulkan components (analogous to the Vulkan driver architecture 150), and the translator module that links them. This is accomplished by keeping the OpenGL-specific and hardware-agnostic modules of the driver architecture 100, and substituting the hardware-specific modules with the Vulkan equivalent of the low-level and hardware-specific modules from the driver architecture 150.

The OpenGL driver component 210 comprises a dispatch module 216 and an OpenGL state tracker 218, which, according to some embodiments, are generally the same as the dispatch module 116 and state tracker 118 as previously described.

The OpenGL driver component 210 also includes a render module 220. According to some embodiments, the render module 220 may be generally the same as the render module 120. However, according to other embodiments, the render module 220 may be a "thin" render module as compared to the render module 120. The thin render module is used to track and allocate resources that will be submitted to the translator module 222. According to some embodiments, the use of a thin render module 220 allows for the render module 220 to be hardware agnostic.

Unlike the render module 120, render module 220 does not need to contribute to providing instructions to a GPU, and, as such, can be designed in order to be hardware agnostic. With this approach, it is possible to achieve an OpenGL-on-Vulkan driver architecture 200 in which the entire OpenGL driver component 210 is hardware-agnostic (i.e. a single OpenGL driver component 210 can be used with any GPU). According to some embodiments, the OpenGL render module 220 is responsible for tracking and allocating resources prior to issuing a call to the translator module 222, as well as invoking the translator module 222.

The translator component 212 comprises a translator module 222. The translator module 222 is responsible for gathering the OpenGL state information and draw commands, and translating those commands into Vulkan commands and state information, as well as generating any Vulkan-specific state/object in order to submit a Vulkan operation.

According to some embodiments, when an application initiates an OpenGL API call, the application is unaware that, at some point, a Vulkan driver will be involved in executing the operation. In this way, the API call travels through the OpenGL driver component 210, and as it enters the translator component 212, the call is transformed to a Vulkan operation. As the operation exits the translator component 212 and enters the Vulkan driver component 214, the Vulkan driver is unaware that the operation originated in an OpenGL application.

There are two main variants of the OpenGL API that are commonly used: a fixed-function pipeline, and a programmable pipeline. These variants result from the fact that modern GPUs contain very few fixed-function stages, and most operations are performed by programmable shaders that are executed on the GPU.

In the fixed-function pipeline version, an OpenGL driver enables and disables a number of states and specific functionalities (e.g. lighting, fog, etc.) and then issues a draw operation. Fixed-function OpenGL drivers managing modern GPUs need to generate shader code behind the scenes in order to simulate the fixed-function hardware stages.

In the programmable pipeline version of OpenGL, most of these fixed-function functionalities are implemented by the application in shader code written using GLSL and compiled into a GPU's instruction set architecture (ISA) by a GPU-specific shader compiler.

In the case of fixed-function drivers, there are two ways in which OpenGL on Vulkan can compile and generate the necessary shaders: ISA and SPIR-V.

The OpenGL component 210 of the driver 200 can compile ISA shader code based on OpenGL state information just like the OpenGL driver 100 does, and submit the ISA shader to the translator component 212. In turn, the translator component 212 provides the ISA shader to the Vulkan driver to load "as is".

Alternatively, the OpenGL driver can compile the shader using the SPIR-V shader language, and submit that to the Vulkan driver. The advantage of this approach is that the OpenGL driver component 210 does not need to be updated for future GPU generations.

The OpenGL-on-Vulkan driver architecture 200 handles the programmable pipeline version similar to the fixed-function approach. The difference between the two approaches is that the application provides the shader code written in the GLSL language. If a GLSL to ISA compiler is used, then the OpenGL driver component 210 provides the ISA shader to the translator component 212 for the Vulkan driver component 214 to load "as is". If a GLSL to SPIR-V compiler is provided then SPIR-V will be provided to the translator component 212, which in turn will pass it to the Vulkan driver component 214 to convert to ISA.

Figure 3:
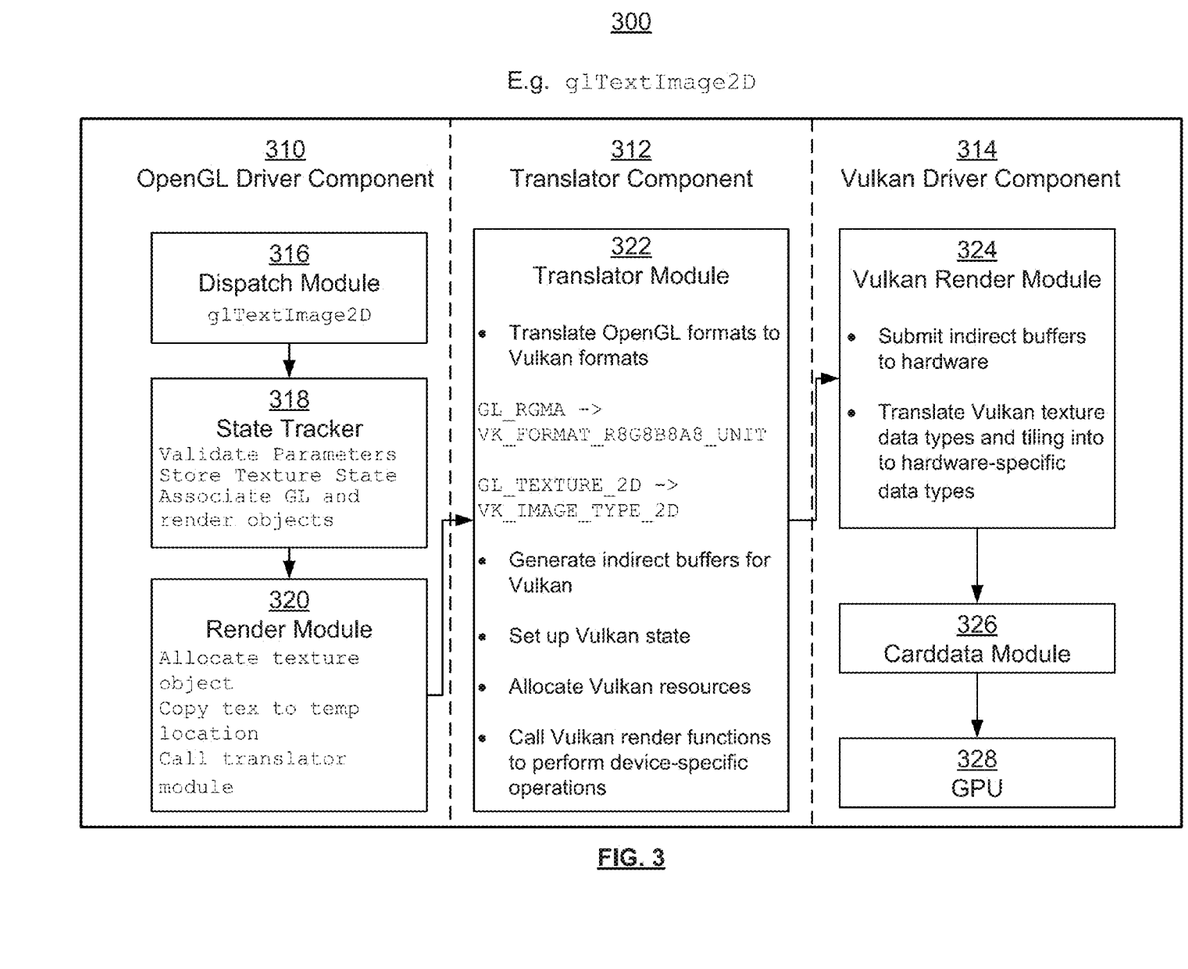
FIG. 3 is a block diagram of the OpenGL-on-Vulkan driver architecture of FIG. 3, in the example of glTexImage2D.

Referring to FIG. 3, there is shown an example 300 of how the OpenGL-on-Vulkan driver architecture 200 can be used to load a two-dimensional texture image using glTexImage2D.

In computer graphics, textures are common means to add detail to a scene. Therefore, loading a texture is a ubiquitous operation in applications written for OpenGL.

As will be described in further detail below, the OpenGL driver component 310 validates the OpenGL API parameters and breaks down the call into state and operation components. The state is then passed along to the translator component 312 along with the desired render operation.

The translator component 312, using the translator module 322, gathers state information from the OpenGL driver component 310 and translates the state information into Vulkan typed states. The translator module 322 translates the OpenGL operation into a Vulkan operation and calls the Vulkan driver component 314 in order to eventually execute the operation on the GPU 328.

The Vulkan driver component 314 gathers the state information and desired operation and uses the Vulkan render module 324 to generate hardware-specific commands to execute the operation. The Vulkan render module 324 then calls the carddata module 326 in order to execute the operation on the GPU 328.

The call is initiated in the application as glTexImage2D ( ), and enters the OpenGL driver component 310 through the dispatch module 316. The dispatch module 316 converts this into an internal call to the appropriate state-tracker function. The state tracker 316 generates and stores OpenGL state information pertaining to the texture object. This includes dimensions, format, etc.

From the state tracker 318, the operation proceeds to the render module 320. In the render module 320, the texture is placed on a temporary location accessible by the GPU (if applicable), and the translator module 322 is invoked to load the texture.

After the translator module 322 is invoked, it is responsible for marshalling the texture object and its OpenGL state into a Vulkan operation. This means translating from OpenGL formats to Vulkan formats. For example, the OpenGL format GL_RGBA can be translated to VK_FORMAT_R8G8B8A8_UNIT, and GL_TEXTURE_2D can be translated to VK_IMAGE_TYPE_2D. Additionally, a Vulkan pipeline, memory, command buffer (indirect buffer), and shader objects can be generated.

Once the translator module 322 formulates a Vulkan operation, it submits the operation to the Vulkan driver component 314 via the appropriate command queues. Subsequently, the Vulkan driver component 314 is responsible for formatting the Vulkan commands into hardware-specific operations for the GPU.

Figure 4:
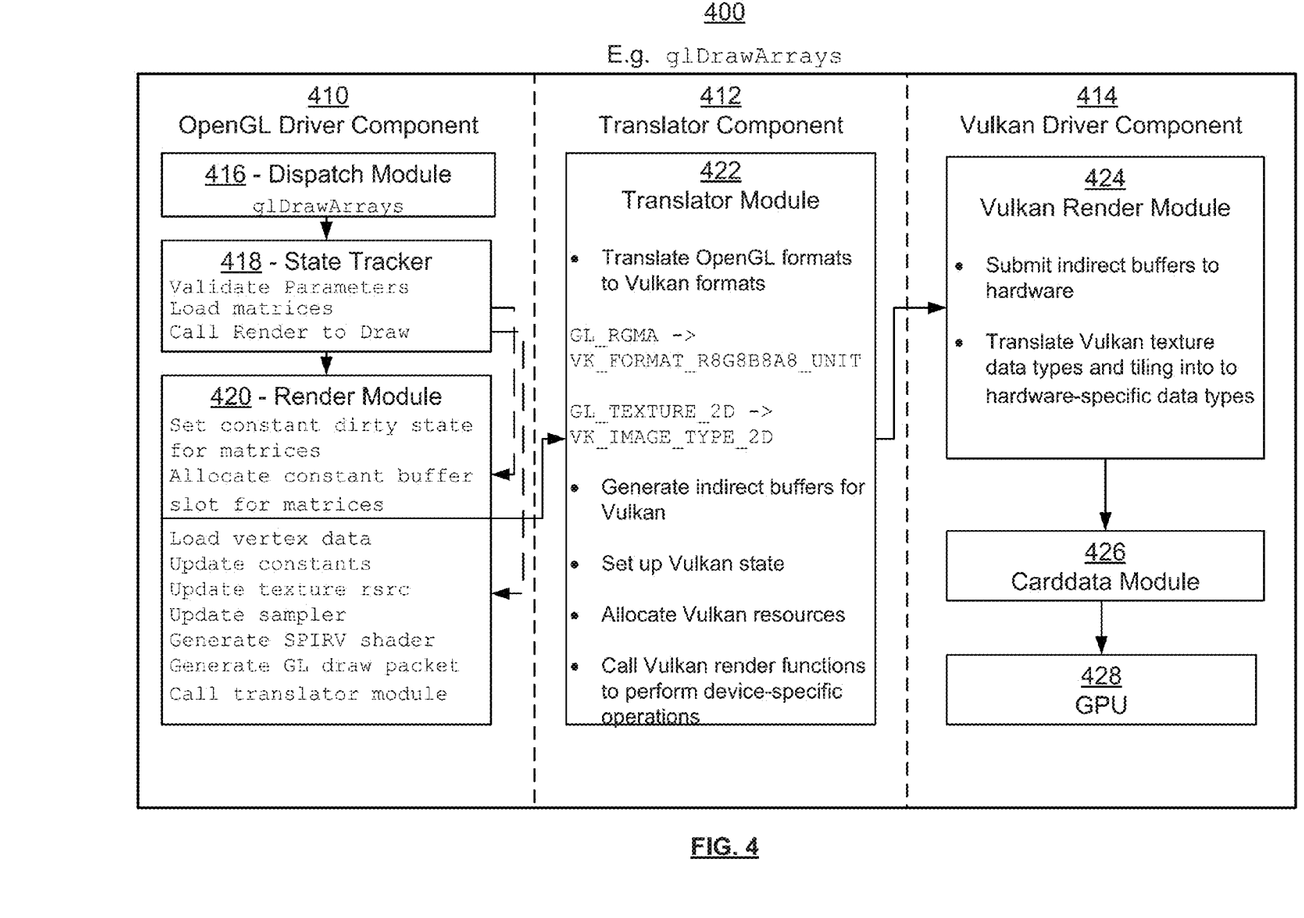
FIG. 4 is a block diagram of the OpenGL-on-Vulkan driver architecture of FIG. 3, in the example of glDrawArrays.

Referring to FIG. 4, there is shown an example 400 of how the OpenGL-on-Vulkan driver architecture 200 can be used to submit a draw command using glDrawArrays.

OpenGL is a state machine where most of the APIs are involved in the recording of state information. It is during a draw operation that all of the recorded state will be checked and submitted to the GPU 428 to affect the output of the operation. glDrawArrays is a common way to submit a draw command to the GPU 428.

As in the example 300, the call is marshalled through the dispatch module 416 and onto the state tracker 418. At this point, relevant state information is stored, and auxiliary operations are performed like loading transformation matrices to a location in system memory to be loaded later as a constant.

The operation proceeds to the render module 420, where a number of important tasks are performed: lower-level state information is stored and tracked (e.g. state flags are dirtied where applicable), vertex data, constants, texture samplers, texture resources are loaded to temporary system memory locations (or compiled in a way that can be presented to the Vulkan translator module 422), SPIR-V shaders are generated and loaded (or compiles in a way that can be presented to the Vulkan translator module 422), and a draw command is generated and submitted to the translator module 422. Subsequently, the translator module 422 is responsible for converting the OpenGL state information, and generating a Vulkan-style draw operation to submit to the Vulkan driver component 414.

Figure 5:
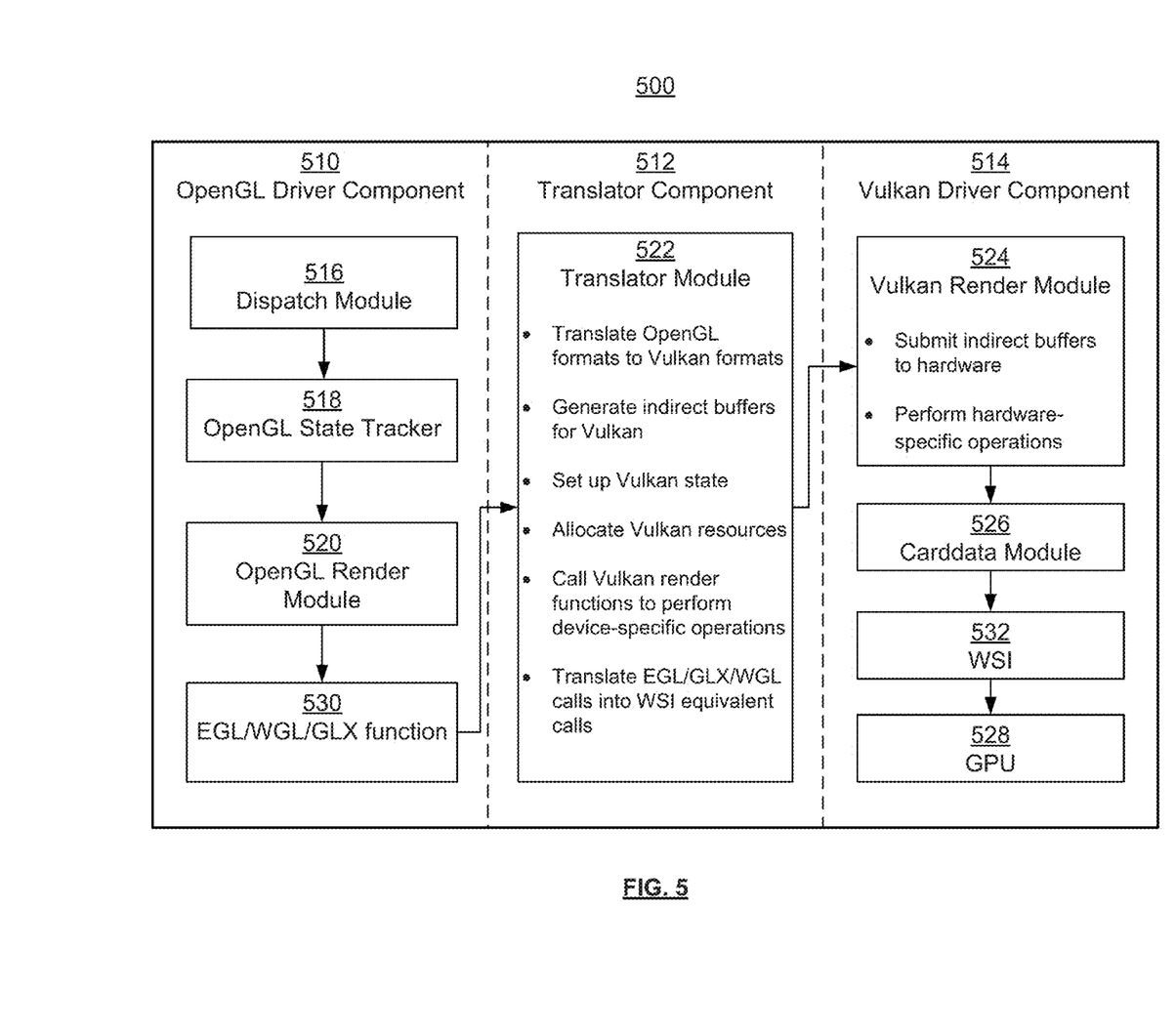
FIG. 5 is a block diagram of an OpenGL-on-Vulkan driver architecture including a translator to Window System Integration (WSI) according to one embodiment.
Figure 6:
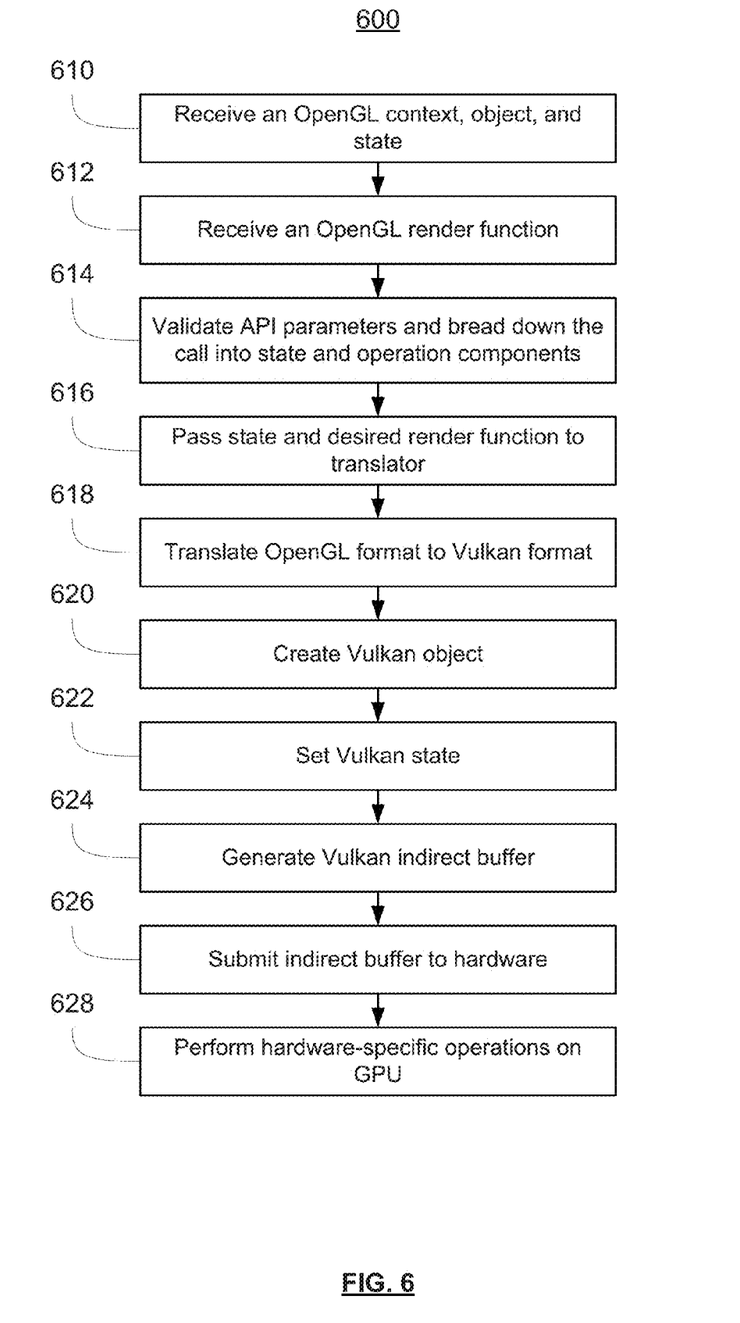
FIG. 6 is a flow diagram depicting a method for using an OpenGL API with a Vulkan graphics driver according to one embodiment.

Referring to FIG. 5, there is shown an OpenGL-on-Vulkan driver architecture 500 that includes a translator to Window System Integration (WSI).

Generally speaking, the OpenGL API allows an application to render color data to a render buffer in video memory. If the render surface were to be displayed on a screen, then a second API would be needed in order to bridge the gap between offscreen rendering and onscreen rendering. The OpenGL API, alone, does not describe a method for the offscreen surface to be displayed.

There are a number of APIs that allow an application to associate a native display to a render context and render surface. These APIs tend to be platform specific, with windows providing WGL, X Windows systems providing GLX, and embedded platforms generally using EGL.

These APIs vary syntactically and some are better suited for certain use cases than the others. In essence, they all accomplish the same thing: the ability to create a graphics context and associate that context with a render surface, and a native display and windowing system, where the native display is a handle to the display driver's display connection.

With the introduction of Vulkan, a new windowing API has emerged to bridge the gap between render surfaces and the native display. Specifically, Vulkan includes Window System Integration (WSI). Unlike EGL, WGL, and GLX, WSI aims to be cross-platform.

According to some embodiments, the OpenGL-on-Vulkan driver architecture 500 may ensure that an OpenGL application need not be aware that it is running on top of a Vulkan driver. Thus, it follows that an application that uses EGL need not be aware that it is running on top of WSI.

In the example shown in FIG. 5, an OpenGL-on-Vulkan driver architecture 500 uses EGL on WSI. The EGL API provides a list of functions that an application can use to create a graphics context, a render surface, a display, and associate the three as the current render targets.

As an example, the EGL application may make API calls in the following order. A call can be made to create an EGL display and associate that display with a native display connection using "eglDisplay=eglGetDisplay(handleToNativeDisplay)". On windows, this may be a handle to the device context or hDC. Then, the EGL display structure can be initialized using eglInitialize(eglDisplay). An EGL configuration matching the provided attributes (color buffer size, depth buffer size, etc.) can be chosen using eglChooseConfig( ). An EGL surface can be created and associated with the EGL display and native windowing system using eglCreateWindowSurface( ). Then, a graphics context can be created and associated with the EGL display using eglCreateContext( ). Finally, a context can be associated with an EGL display and an EGL surface, and these can be made the current render target using eglMakeCurrent( ).

In order to accomplish the above, and utilize WSI in Vulkan, the translator module 522 can translate the EGL (or GLX or WGL) into an equivalent WSI call. The translator module 522 receives the EGL (or WGL or GLX) function 530, translates it to the equivalent WSI call 532, which is then sent to the GPU 528.

Figure 7:
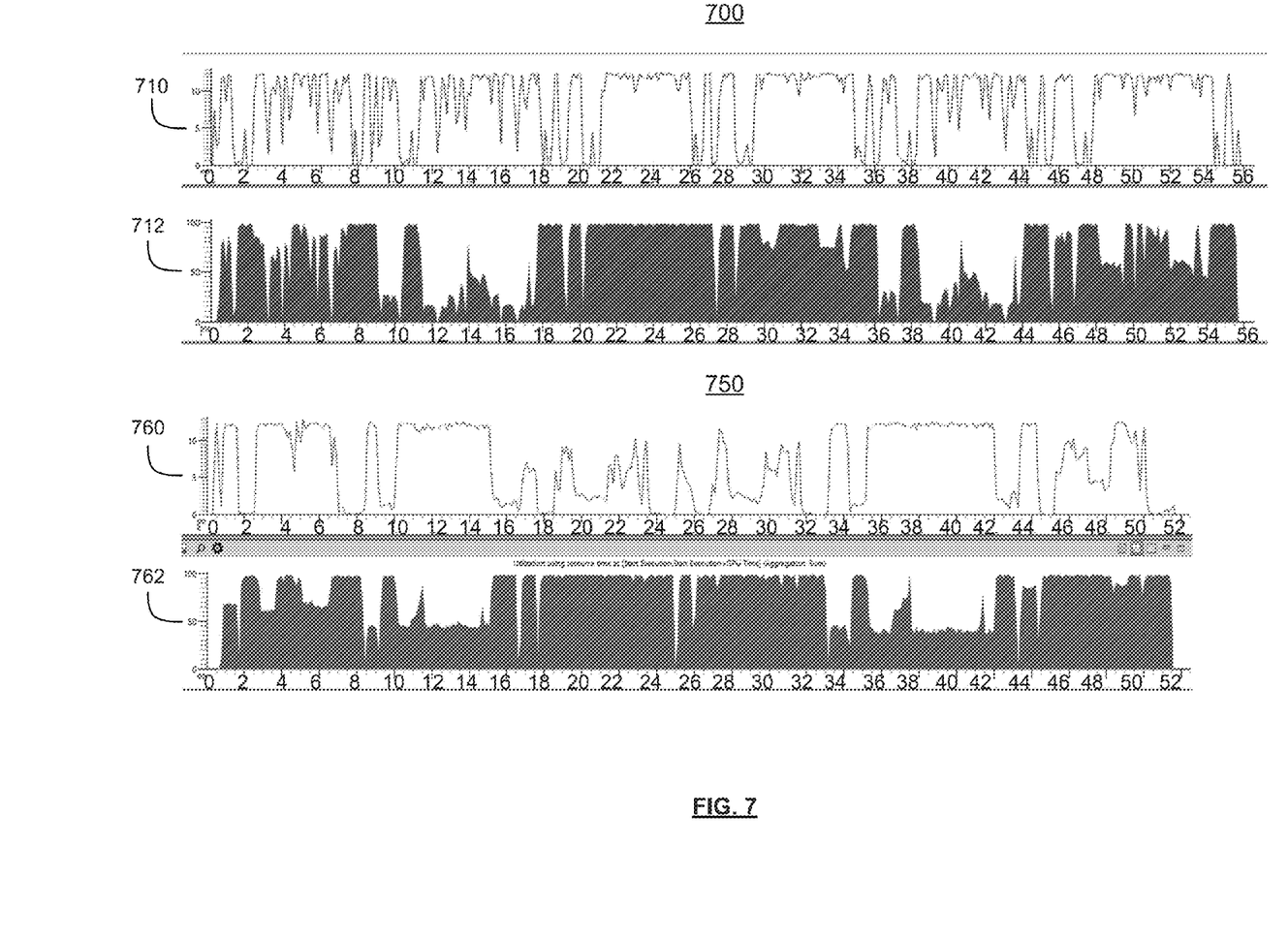
FIG. 7. is a diagram showing exemplary performance analysis data according to one embodiment.

Referring now to FIG. 7, illustrated therein are exemplary performance analysis data 700 and 750 according to one embodiment. The performance analysis data 700 are based on a benchmark test using an AMD™ OpenGL ES 2 driver. The performance analysis data 750 are based on a benchmark test using the Vulkan SC 2 layer (e.g., as described herein). The graphs 710 and 760 show CPU utilization (% weight using resource time), and the graphs 712 and 762 show GPU utilization (utilization as resource time).

Figure 8:
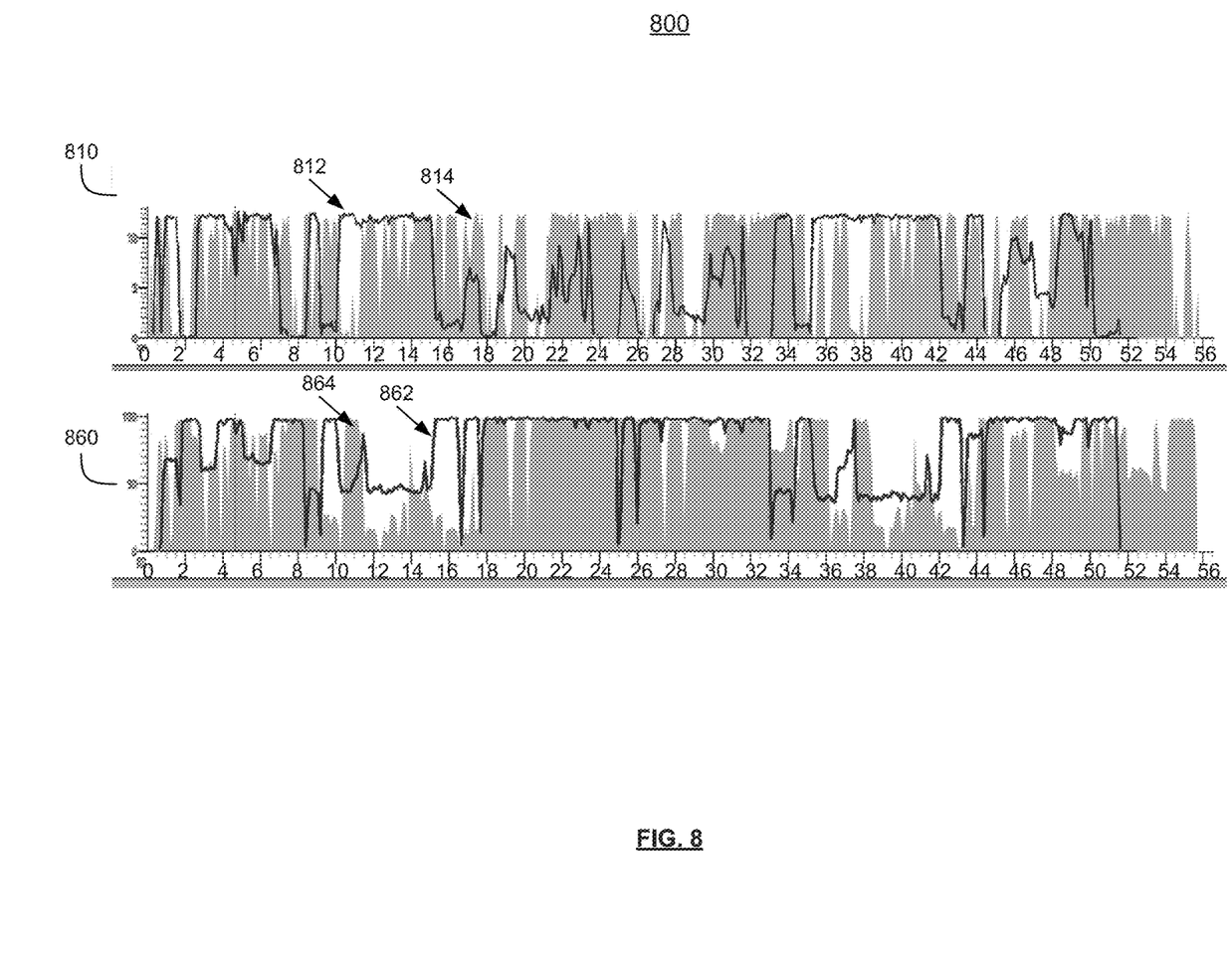
FIG. 8 is another diagram showing exemplary performance data according to one embodiment.

Referring now to FIG. 8, illustrated therein are exemplary performance analysis data 800 according to one embodiment. The graph 810 shows CPU utilization, and the graph 860 shows GPU utilization. The curves 812 and 862 represent a rendering test using Vulkan, and the curves 814 and 864 represent a rendering test using GL ES 2.0. As can be seen, the Vulkan test was concluded in a total time of 51.6 seconds, whereas the GL ES 2.0 test was concluded in a total time of 55.6 seconds. The overlay comparisons shown in the graphs 810 and 860 show less CPU usage to achieve full GPU loading, as shown in the middle section of the curves. These results also show that the GPU and CPU usage is more even and constant under most conditions using the Vulkan API instead of the GL API.

In respect of immediate-mode rendering design, benchmark testing verifies that, at the time of glDrawArray or glDrawRangeElement, vertex and index data are copied to Circularly accessed VBO and IBOs. Uniform data are updated in Descriptor Set. Binding of VBO and IBOs is queued before a draw command with binding point starting at the start of data write, and the draw command is queued.

When circular buffers are half full, or some number of draw commands have been put in the queue, the queue is sent to the GPU. In some cases, for example, this may be set to occur with 1,000 draw commands, or when 500 Bytes of vertex data are achieved.

Vulkan uses Pipelines that are combinations of the vertex and fragment shader code, fetch shader definition, and render state setup (primitive type, clipping, viewport, depth bounds, etc.). To allow use of a GL Program concept, there is a composite object that holds the shader code and definition of the VS attributes and uniforms, and a list of pipelines that can represent the program. Each pipeline can maintain a set of data of the properties that make that pipeline unique.

While the above description provides examples of one or more apparatus, methods, or systems, it will be appreciated that other apparatus, methods, or systems may be within the scope of the claims as interpreted by one of skill in the art.

The invention claimed is:

1. A method for using an OpenGL API with a Vulkan graphics driver for a graphics processing unit, using at least one processor, the method comprising:
  receiving, from an OpenGL render routine executed at run-time by the at least one processor, an OpenGL context having an associated context state, and a plurality of OpenGL objects bound to the OpenGL context, each of the plurality of OpenGL objects having respective associated object states;
  receiving, at run-time, at least one OpenGL render command from the OpenGL render routine;
  compiling, at run-time, a compiled shader based on the at least one OpenGL render command and the OpenGL context, wherein the compiling comprises generating the compiled shader in SPIR-V shader language; and
  in response to compiling the compiled shader:
    translating respective OpenGL formats of each of the OpenGL objects to respective Vulkan formats;
    creating a plurality of Vulkan objects corresponding to the OpenGL objects and based on the respective Vulkan formats;
    setting a plurality of Vulkan object states based on the plurality of associated object states for the plurality of OpenGL objects bound to the OpenGL context, and further based on the associated context state for the OpenGL context;
    based on the plurality of Vulkan objects and Vulkan object states, generating a plurality of Vulkan commands in a Vulkan command buffer, the plurality of Vulkan commands comprising the compiled shader; and
    after generating the plurality of Vulkan commands, re-compiling the compiled shader to generate a specific shader in an instruction set architecture of the graphics processing unit.

2. The method of claim 1, wherein at least one of the OpenGL objects is a texture object, the respective OpenGL format is an OpenGL image format, and the respective Vulkan format is a Vulkan image format.

3. The method of claim 1, wherein at least one of the OpenGL formats corresponds to GL_RGBA and the respective Vulcan format corresponds to VK-FORMAT_R8G8B8A8_UINT.

4. The method of claim 1, wherein at least one of the OpenGL objects is of a type GL_TEXTURE_1D and the respective Vulkan object is of a type VK_IMAGE_TYPE_1D.

5. The method of claim 1, wherein at least one of the OpenGL objects is of a type GL_TEXTURE_2D and the respective Vulkan object is of a type VK_IMAGE_TYPE_2D.

6. The method of claim 1, wherein at least one of the OpenGL objects is of a type GL_TEXTURE_3D and the respective Vulkan object is of a type VK_IMAGE_TYPE_3D.

7. The method of claim 1, wherein at least one of the OpenGL formats corresponds to GL_TRIANGLES and the respective Vulkan format corresponds to VK_PRIMITIVE_TOPOLOGY_TRIANGLE_LIST.

8. The method of claim 1, further comprising:
  receiving one of an EGL, WGL, and GLX function call as an interface between the OpenGL context and a windowing system; and
  translating the interface to a Window System Integration (WSI) function call.

9. The method of claim 1, wherein the OpenGL render routine is hardware-agnostic.

10. A computing device configured to use an OpenGL API with a Vulkan graphics driver, the computing device comprising:
  a graphics processing unit;
  at least one processor; and
  a memory, the memory comprising executable computer instruction code, which when executed by the at least one processor, causes the at least one processor to perform a method for using an OpenGL API with a Vulkan graphics driver for the graphics processing unit, the method comprising:
    receiving, from an OpenGL render routine executed at run-time by the at least one processor, an OpenGL context having an associated context state, and a plurality of OpenGL objects bound to the OpenGL context, each of the plurality of OpenGL objects having respective associated object states;
    receiving, at run-time, at least one OpenGL render command from the OpenGL render routine;
    compiling, at run-time, a compiled shader based on the at least one OpenGL render command and the OpenGL context, wherein the compiling comprises generating the compiled shader in SPIR-V shader language; and
    in response to compiling the compiled shader:
      translating respective OpenGL formats of each of the OpenGL objects to respective Vulkan formats;
      creating a plurality of Vulkan objects corresponding to the OpenGL objects and based on the respective Vulkan formats;
      setting a plurality of Vulkan object states based on the plurality of associated object states for the plurality of OpenGL objects bound to the OpenGL context, and further based on the associated context state for the OpenGL context;
      based on the plurality of Vulkan objects and Vulkan object states, generating a plurality of Vulkan commands in a Vulkan command buffer, the plurality of Vulkan commands comprising the compiled shader; and
      after generating the plurality of Vulkan commands, re-compiling the compiled shader to generate a specific shader in an instruction set architecture of the graphics processing unit.

11. A non-transitory, computer-readable medium, comprising an OpenGL render routine comprising computer instruction code that is executable by at least one processor, the computer instruction code when executed by the at least one processor causing the at least one processor to perform a method for using an OpenGL API with a Vulkan graphics driver for a graphics processing unit, the method comprising
  receiving, from an OpenGL render routine executed at run-time by the at least one processor, an OpenGL context having an associated context state, and a plurality of OpenGL objects bound to the OpenGL context, each of the plurality of OpenGL objects having respective associated object states;
  receiving, at run-time, at least one OpenGL render command from the OpenGL render routine;
  compiling, at run-time, a compiled shader based on the at least one OpenGL render command and the OpenGL context, wherein the compiling comprises generating the compiled shader in SPIR-V shader language; and in response to compiling the compiled shader:
  translating respective OpenGL formats of each of the OpenGL objects to respective Vulkan formats;
  creating a plurality of Vulkan objects corresponding to the OpenGL objects and based on the respective Vulkan formats;
  setting a plurality of Vulkan object states based on the plurality of associated object states for the plurality of OpenGL objects bound to the OpenGL context, and further based on the associated context state for the OpenGL context;
  based on the plurality of Vulkan objects and Vulkan object states, generating a plurality of Vulkan commands in a Vulkan command buffer, the plurality of Vulkan commands comprising the compiled shader; and
  after generating the plurality of Vulkan commands, re-compiling the compiled shader to generate a specific shader in an instruction set architecture of the graphics processing unit.

12. The non-transitory, computer-readable medium of claim 11, wherein at least one of the OpenGL objects is a texture object, the respective OpenGL format is an OpenGL image format, and the respective Vulkan format is a Vulkan image format.

13. The non-transitory, computer-readable medium of claim 11, wherein at least one of the OpenGL formats corresponds to GL_RGBA and the respective Vulcan format corresponds to VK-FORMAT_R8G8B8A8_UINT.

14. The non-transitory, computer-readable medium of claim 11, wherein at least one of the OpenGL objects is of a type GL_TEXTURE_1D and the respective Vulkan object is of a type VK_IMAGE_TYPE_1D.

15. The non-transitory, computer-readable medium of claim 11, wherein at least one of the OpenGL objects is of a type GL_TEXTURE_2D and the respective Vulkan object is of a type VK_IMAGE_TYPE_2D.

16. The non-transitory, computer-readable medium of claim 11, wherein at least one of the OpenGL objects is of a type GL_TEXTURE_3D and the respective Vulkan object is of a type VK_IMAGE_TYPE_3D.

17. The non-transitory, computer-readable medium of claim 11, wherein at least one of the OpenGL formats corresponds to GL_TRIANGLES and the respective Vulkan format corresponds to VK_PRIMITIVE_TOPOLOGY_TRIANGLE_LIST.

18. The non-transitory, computer-readable medium of claim 11, the method further comprising:
  receiving one of an EGL, WGL, and GLX function call as an interface between the OpenGL context and a windowing system; and
  translating the interface to a Window System Integration (WSI) function call.

19. The non-transitory, computer-readable medium of claim 11, wherein the OpenGL render routine is hardware-agnostic.

* * * * *